(12) United States Patent
Janzen

(10) Patent No.: US 10,207,877 B2
(45) Date of Patent: Feb. 19, 2019

(54) GUARD DEVICE FOR TRANSPORT BAGS IN A LOADING STATION OF AN OVERHEAD CONVEYOR SYSTEM AND LOADING STATION COMPRISING A GUARD DEVICE OF THIS TYPE

(71) Applicant: Dürkopp Fördertechnik GmbH, Bielefeld (DE)

(72) Inventor: Paul Janzen, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 0 days.

(21) Appl. No.: 15/894,027

(22) Filed: Feb. 12, 2018

(65) Prior Publication Data

US 2018/0229944 A1    Aug. 16, 2018

(30) Foreign Application Priority Data

Feb. 13, 2017  (DE) ................ 10 2017 202 200

(51) Int. Cl.
| | | |
|---|---|---|
| B65G 47/12 | (2006.01) | |
| B65G 47/61 | (2006.01) | |
| B65G 19/02 | (2006.01) | |
| B65G 11/02 | (2006.01) | |

(52) U.S. Cl.
CPC .......... *B65G 47/61* (2013.01); *B65G 11/023* (2013.01); *B65G 19/025* (2013.01); *B65G 47/12* (2013.01); *B65G 2201/02* (2013.01); *B65G 2201/0261* (2013.01)

(58) Field of Classification Search
CPC ........................ B65G 11/023; B65G 19/025

USPC .................................................. 198/562, 564
See application file for complete search history.

(56) References Cited

U.S. PATENT DOCUMENTS

| | | | | |
|---|---|---|---|---|
| 3,504,713 A | | 4/1970 | Gmur | |
| 4,398,383 A | * | 8/1983 | Prakken | B65B 5/061 53/247 |
| 4,524,564 A | * | 6/1985 | Groom | B65B 35/28 53/173 |
| 4,526,075 A | * | 7/1985 | Wright | A23N 15/00 198/382 |
| 5,437,231 A | * | 8/1995 | Janzen | B61B 10/025 104/162 |
| 5,622,025 A | * | 4/1997 | Kitagawa | B65B 5/061 198/403 |
| 5,901,832 A | * | 5/1999 | Woolley | B65B 43/465 198/345.2 |
| 5,971,131 A | * | 10/1999 | Blattner | B65G 33/02 198/349.95 |

(Continued)

FOREIGN PATENT DOCUMENTS

| | | |
|---|---|---|
| DE | 10 2005 006 455 A1 | 8/2006 |
| DE | 10 2008 061 685 A1 | 6/2010 |

(Continued)

*Primary Examiner* — Douglas A Hess
(74) *Attorney, Agent, or Firm* — McGlew and Tuttle, P.C.

(57) ABSTRACT

A guard device for transport bags in a loading station of an overhead conveyor system comprises a mounting unit to mount the guard device to a conveyor device of the overhead conveyor system, an impact plate to support a rear wall of a transport bag when being loaded with a product to be transported, and a connection unit to movably connect the impact plate to the mounting unit.

20 Claims, 22 Drawing Sheets

(56) References Cited

U.S. PATENT DOCUMENTS

| | | | | |
|---|---|---|---|---|
| 6,640,158 B1* | 10/2003 | Brandt, Jr. | ............... | G01F 1/30 |
| | | | | 177/116 |
| 6,874,615 B2* | 4/2005 | Fallas | ................... | B65G 47/22 |
| | | | | 198/434 |
| 7,469,522 B2* | 12/2008 | Dettwiller | ............... | B65B 3/02 |
| | | | | 53/133.1 |
| 8,490,774 B2* | 7/2013 | Janzen | ............... | B65G 19/025 |
| | | | | 198/384 |
| 8,561,787 B2* | 10/2013 | Wend | ................. | B65G 19/025 |
| | | | | 104/172.1 |
| 8,607,964 B2* | 12/2013 | Kheifets | ............... | B65G 43/08 |
| | | | | 193/21 |
| 8,672,118 B2* | 3/2014 | Janzen | .................. | B65G 47/61 |
| | | | | 198/678.1 |
| 9,187,252 B2* | 11/2015 | Wend | ..................... | B65G 17/12 |
| 2012/0037272 A1 | 2/2012 | Wend et al. | | |

FOREIGN PATENT DOCUMENTS

| | | |
|---|---|---|
| DE | 10 2012 018925 A1 | 3/2014 |
| EP | 2 418 160 A1 | 2/2012 |
| JP | S52 168750 U | 12/1977 |

* cited by examiner

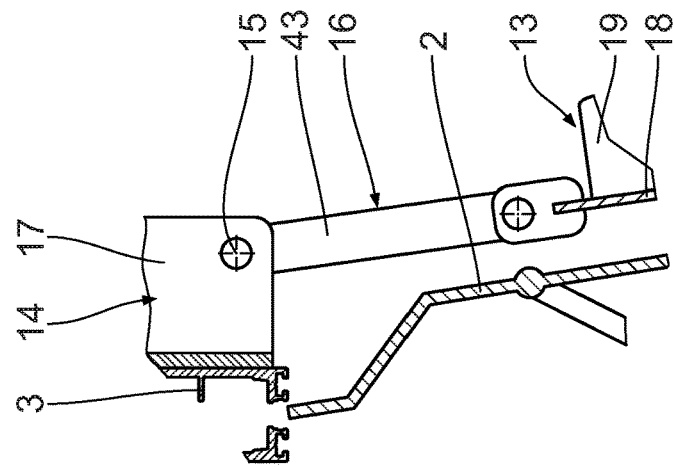
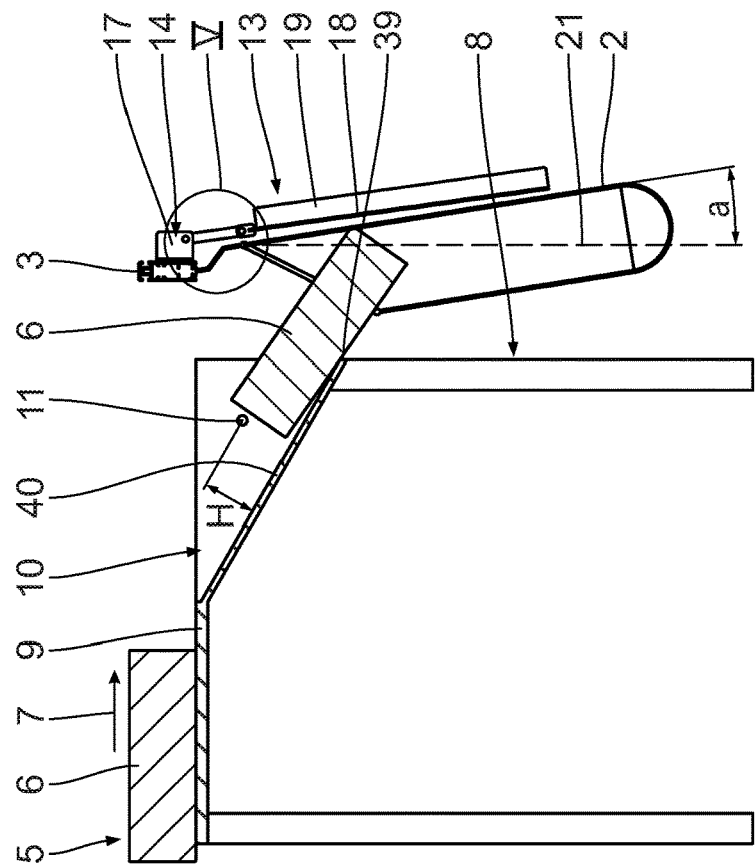

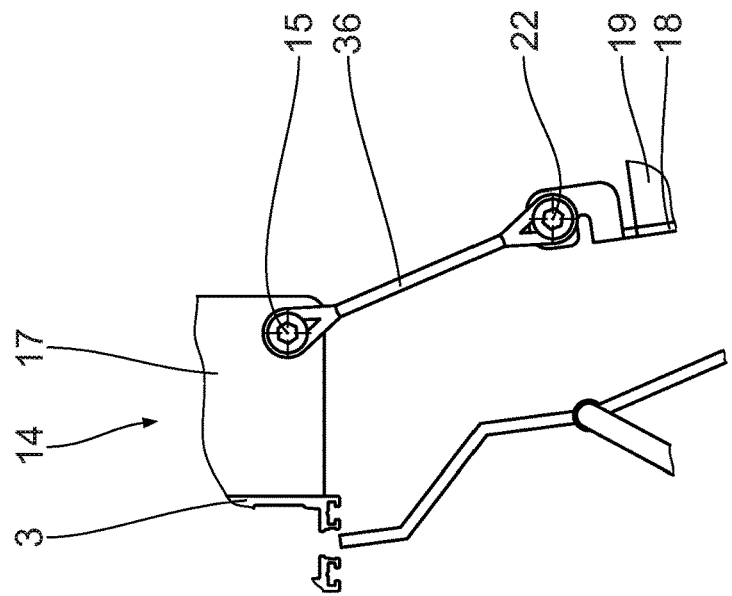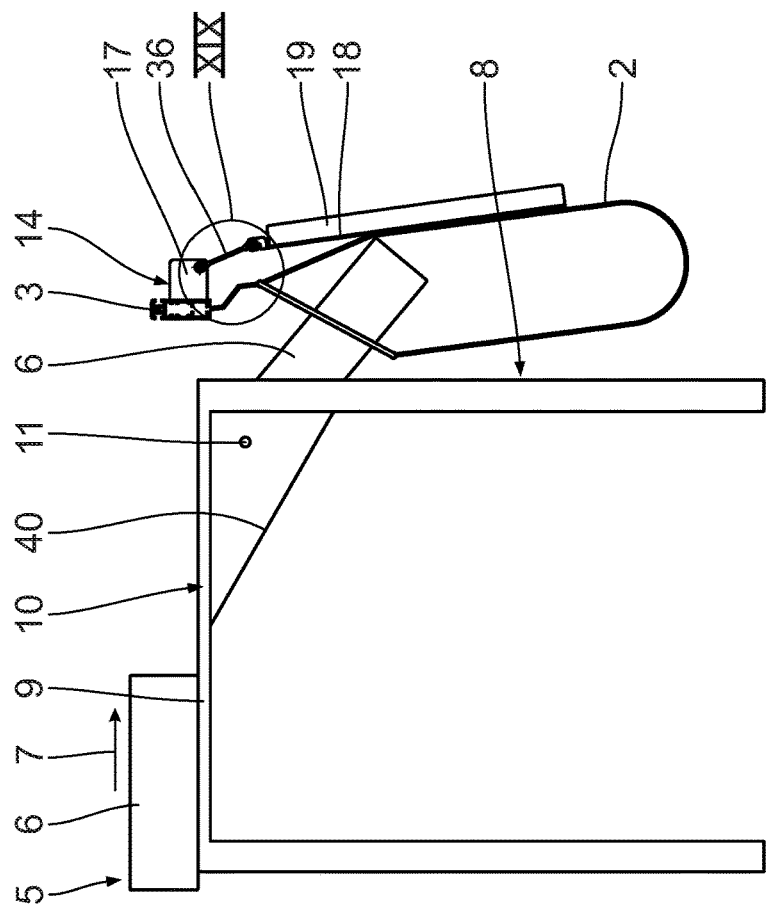

GUARD DEVICE FOR TRANSPORT BAGS IN A LOADING STATION OF AN OVERHEAD CONVEYOR SYSTEM AND LOADING STATION COMPRISING A GUARD DEVICE OF THIS TYPE

CROSS-REFERENCE TO RELATED APPLICATIONS

This application claims priority of German Patent Application Serial No. DE 10 2017 202 200.0 filed on Feb. 13, 2017, pursuant to 35 U.S.C. 119(a)-(d), the content of which is incorporated herein by reference in its entirety as if fully set forth herein.

FIELD OF THE INVENTION

The invention relates to a guard device for transport bags in a loading station of an overhead conveyor system and to a loading station comprising a guard device of this type.

BACKGROUND OF THE INVENTION

In an overhead conveyor system, a loading station is used for the loading of transport bags containing products to be transported in a suspended manner, wherein said products may have various sizes, various masses, and various packagings. A loading station of this type is known from DE 10 2008 061 685 A1. In order to ensure that the transport bags are loaded reliably even with large cardboard boxes, the transport bags are opened to a maximum extent. The maximum opening of the bag may cause smaller items to fall into the transport bag in an undefined manner, with the result that they are in particular arranged in the transport bags in such a way that the largest dimension of the cardboard box defines the bag width oriented in the conveying direction. Cardboard boxes conveyed in this manner may be damaged in an accumulation zone of the overhead conveyor system because of the accumulation pressure prevailing there. The maximum bag opening may cause limp products packed in bags, for example, to be folded or bent in the shape of a letter U on the bottom of the bag, thus resulting in an undesirable crease.

SUMMARY OF THE INVENTION

It is the object of the present invention to allow transport bags to be loaded in a reliable and simple manner all the while ensuring a flexible loading thereof depending on the products to be transported.

This object is achieved according to the invention by a guard device for transport bags in a loading station of an overhead conveyor system, the guard device comprising a mounting unit to mount the guard device to a conveyor device of the overhead conveyor system, an impact plate to support a rear wall of a transport bag when being loaded with a product to be transported, and a connection unit to movably connect the impact plate to the mounting unit, and by a loading station for an overhead conveyor system, the loading station comprising a conveyor device to convey the transport bags, a feed device to feed transport products along a product feed direction, and a guard device according to the invention, the guard device being mounted to the conveyor device.

It was found according to the invention that a guard device allows an improved loading of transport bags. The guard device has an impact plate. The impact plate supports a rear wall of the transport bag when being loaded with the products to be transported, wherein a connection unit is provided to ensure movability of the impact plate. The connection unit serves to movably connect the impact plate to a mounting unit. The mounting unit serves to mount the guard device to a conveyor device of an overhead conveyor system. The guard device is in particular provided in the region of a loading station of the overhead conveyor system. The conveyor device is in particular a conveyor rail along which the transport bags are transportable in a conveying direction. The transport bags can be transported using roll adapters such as those known from DE 10 2005 006 455 A1, for example, or, in particular, using a hanger neck, making said roll adapters redundant. The guard device allows a deflection of the impact plate depending on the size of the product to be transported. In the loading station, the transport bag is in an open position. In the open position, the transport bag has a bag opening the size of which is such that a product to be transported is—in a first step—able to protrude from the loading station into the transport bag via the opening. If the size of the product to be transported is too large for the product to fall into the transport bag through the opening thereof automatically due to gravity, the movable impact plate allows the rear wall of the transport bag to be deflected in such a way that the size of the opening of the transport bag increases. When the impact plate is deflected by the product to be transported, a restoring force acts on the impact plate. As soon as the product to be transported has fallen into the transport bag through the opening thereof, the impact plate will move back to its initial position automatically, in particular due to the restoring force, causing the opening of the transport bag to revert to the initial position. The guard device has an in particular exclusively passive effect. Additional components, in particular active or drivable opening devices, ensuring an active opening of the transport bag are not required. The guard device has a sturdy and simple design. The guard device allows the opening of the transport bag to be adapted individually to the size of the product to be transported.

The guard device is in particular configured as a component of a loading station of an overhead conveyor system. The guard device is in particular arranged in such a way as to be immovable in relation to the transport direction of the transport bags. Except for the movable connection with the mounting unit, the impact plate is arranged immovably on the guard device. The impact plate is in particular configured such as to be separate from the transport bag. The transport bag is transported through the loading station along the transport direction of the overhead conveyor system. In particular, the transport bag is transported along the transport direction into the loading position where the guard device is arranged. After loading, the transport bag is in particular moved away from the guard device. The impact plate forms part of the guard device. The transport bag does not form part of the guard device.

A guard device configured such that the connection unit is articulated to the mounting unit in such a way as to be pivotable about a mounting unit pivot axle allows a particularly advantageous simple deflection of the impact plate. The impact plate is articulated to the mounting unit in such a way as to be pivotable. In an initial position, the impact plate is in particular arranged such as to hang down vertically due to gravity. When a loading force is exerted on the impact plate when being loaded with the products to be transported, the impact plate is pivoted, in other words deflected, in a direction counter to the direction of gravity. The restoring force that acts thereon is the force of gravity that causes the impact plate to immediately revert to the initial position as soon as the force exerted by the product to be transported no longer exists. The restoring torque acting on the impact plate that develops as a result of the restoring force is directly proportional to its deflection. The greater the pivoting angle, then the greater the restoring force. The connection unit is pivotably articulated to the mounting unit in particular about a mounting unit pivot axle. Said pivotable articulation may in particular be brought about in an advantageous manner by means of a bolt connection comprising a pivotable sleeve. It is in particular the connection unit that is configured as a pivotable sleeve. This configuration is particularly simple and cost-saving. The impact plate may be articulated directly to the sleeve, which is pivotable about the mounting unit pivot axle, or to a connection arm, which is mounted to the pivotable sleeve. The connection arm extends in particular radially to the mounting unit pivot axle. The mounting unit pivot axle is oriented in particular parallel to the conveying direction of the transport bag. The transport bag is in particular arranged in such a way as to be pivotable in relation to the conveying direction in the conveyor device, in particular the conveyor rail.

A guard device configured such the connection unit is articulated to the impact plate in such a way as to be pivotable about an impact plate pivot axle allows an advantageous pivotability of the impact plate itself. As the connection unit is articulated to the impact plate in such a way as to be pivotable about an impact plate pivot axle, it is possible for the impact plate to be arranged on the rear side of the transport bag in such a way as to hang down vertically although it is deflected, in particular pivoted, in relation to the mounting unit. The impact plate pivot axle is in particular oriented parallel to the conveying direction of the transport bag, and in particular parallel to the mounting unit pivot axle.

The connection unit in particular forms a pivot joint for connecting the impact plate to the mounting unit in a pivotable manner. The pivot joint may be configured as a single-part hinge that is formed continuously in the conveying direction. In this case, the hinge is configured in the manner of a bar. It is conceivable as well for two or more hinges to be arranged at a distance from one another along the conveyor device, each of which permitting a hinge-like arrangement of the impact plate on the mounting unit.

The embodiment of the connection unit comprising a chain, a rod, a bar, a cable and/or a textile web is advantageous. A chain is in particular available as a standard component in the field of material handling. The chain allows a flexible and sturdy hinge-like arrangement of the impact plate on the mounting unit.

Alternatively, the connection unit comprising a linear displacement member for a linear displacement of the impact plate in relation to the mounting unit along a displacement direction may be provided with a linear displacement member to allow a linear displacement of the impact plate in relation to the mounting unit. The linear displacement occurs along a linear displacement direction, which is in particular oriented perpendicular to the conveying direction of the transport bag. In particular, the displacement direction is oriented substantially along a product feed direction. This ensures that a direct deflection movement of the impact plate caused by the feeding of the products to be loaded is possible in a simplified manner.

Guide members of the connection unit for the guided displacement along the displacement direction ensure that a passive displacement of the impact plate occurs as reliably as possible. The guide members may be provided with guide rolls, for example, which roll along guide tracks, in particular guide rails, matching these guide rolls. Slide members may be provided in addition to or as an alternative to the guide rolls.

An energy storage member of the connection unit assists the return movement of the impact plate into its initial position. The energy storage member may be configured as a spring member, in particular a helical spring, for example. The energy storage member is provided in particular in those cases where the connection unit is provided with a linear displacement member. The energy storage member may, however, also be provided if the connection unit is configured as a hinge. The energy storage member exerts a spring force on the impact plate, said spring force acting as a restoring force, said restoring force being in particular proportional to the deflection of the impact plate. Depending on the articulation points of the energy storage member, it is conceivable to provide a tension spring or a compression spring.

As an alternative or in addition to the energy storage members, it is conceivable to use actuators configured as stepped cylinders to allow a displacement of the impact plate with a substantially constant force. When using actuators, it is advantageous to provide a measuring unit that detects the height of a product to be transported, in particular a cardboard box, and in particular also the weight thereof to bring about a necessary displacement of the impact plate by means of the at least one actuator.

A displacement actuator of the connection unit for a driven displacement of the impact plate assists the displacement of the impact plate. This reduces the effect of a force acting on the packaging of the product to be transported. The risk of damages to the products to be transported is thus reduced.

A feed member on the impact plate ensures an ordered feeding of the transport bags into the loading station. An inadvertent swinging of the transport bag in the loading station in a plane perpendicular to the conveying direction is thus reduced and in particular prevented.

A loading station for an overhead conveyor system, the loading station comprising a conveyor device to convey the transport bags, a feed device to feed transport products along a product feed direction, and a guard device according to the invention, the guard device being mounted to the conveyor device, substantially has the advantages of the guard device to which reference is made. The loading station in particular forms part of the overhead conveyor system. The loading station has a conveyor device allowing the transport bags to be conveyed along a conveying direction. In particular, the conveyor device has a conveyor rail. Additionally, the loading station has a feed device for feeding the product to be transported in a product feed direction. The loading station further has the guard device, which is mounted to the conveyor device. It is advantageous if the product feed direction is oriented transversely, and in particular perpendicular to the conveying direction of the transport bags. The accessibility of the transport bags for the loading thereof is thus improved.

An arrangement of the impact plate being oriented perpendicular to the product feed direction allows a reliable and rugged feeding and, therefore, loading of the transport bag. The impact plate is able to absorb forces exerted on the impact plate by the products to be transported in an advantageous manner.

A detection unit configured to detect the size and/or mass of the product to be transported allows detection of the size and/or mass of the product to be transported. The detection unit can be configured as one or a plurality of photoelectric sensors arranged in the region of the transport bags.

A control unit for the controlled loading of the transport bag in the loading station allows the transport bags to be loaded in the loading station in a controlled manner. In particular, it is conceivable to provide for a controlled arrangement of the transport bags in the loading station, for example the stopping of the transport bags in the loading station.

A signal connection between the control unit and the detection unit and/or with a displacement actuator for the targeted loading of the transport bag ensures a direct communication between the control unit and the detection unit and/or a displacement actuator to improve the loading of the transport bag even more.

A loading station configured such that the feed device comprises a storage surface with a feed chute allows a simple loading. The loading unit can be configured as a loading table with a storage surface. A feed hopper, which is configured as a downwardly inclined ramp on the loading table, allows the product to be fed into the transport bag directly due to gravity. The loading station is intended to be loaded manually by an operator. In addition or as an alternative thereto, the products to be transported can be fed in an automated manner by means of a belt conveyor, which is in particular arranged in such a way that one of the deflection rolls is arranged in the region of the bag opening. Alternatively, it is also conceivable to provide a roll conveyor, which is advantageous in particular when feeding large, in other words large-volume, products.

Further advantages, additional features and details of the invention will emerge from the ensuing description of exemplary embodiments, taken in conjunction with the drawing.

BRIEF DESCRIPTION OF THE DRAWING

FIG. 4 shows a sectional view along section line IV-IV in FIG. 3;

FIG. 5 shows an enlarged detail view of detail V in FIG. 4;

FIG. 18 shows a side view, corresponding to FIG. 4, of a loading station comprising a guard device according to another embodiment;

FIG. 19 shows an enlarged detail view of detail XIX in FIG. 18;

DESCRIPTION OF THE PREFERRED EMBODIMENTS

Figure 1:
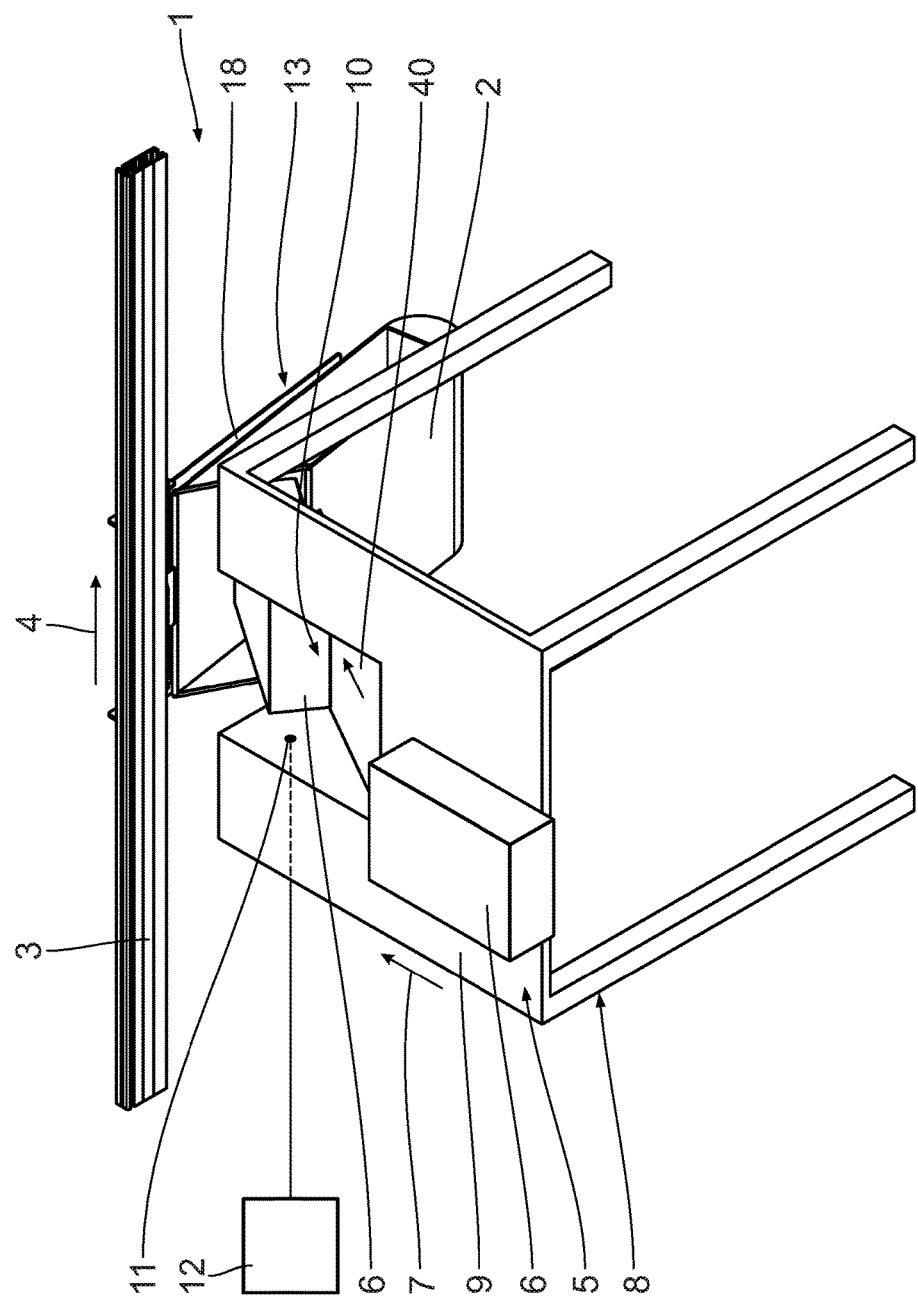
FIG. 1 shows a perspective front view of a loading station of an overhead conveyor system comprising a guard device for transport bags according to the invention.
Figure 2:
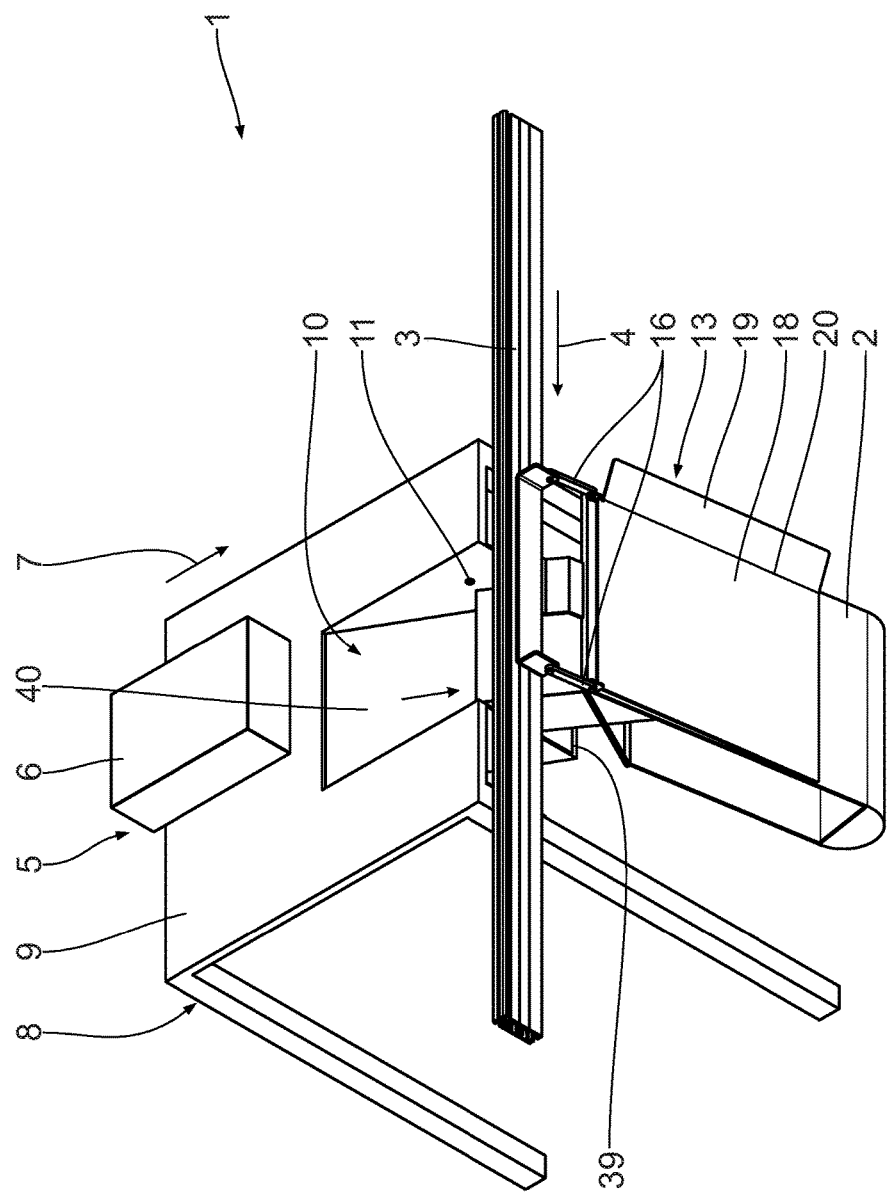
FIG. 2 shows a perspective rear view of the loading station according to FIG. 1.
Figure 3:
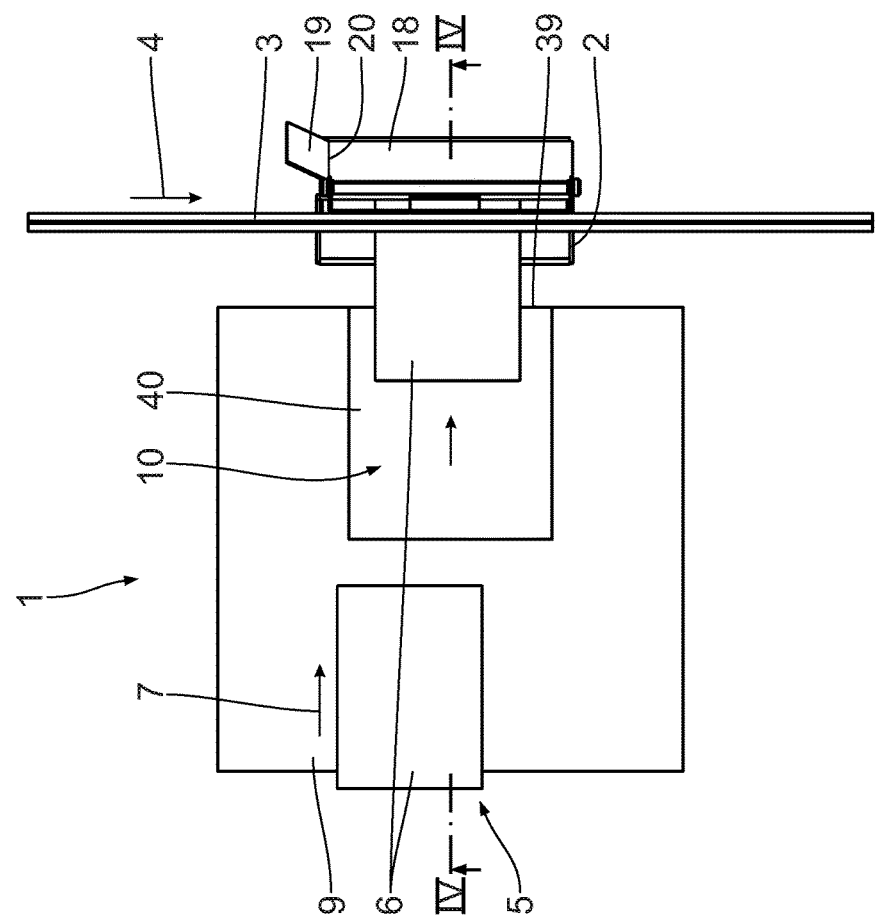
FIG. 3 shows a plan view of the loading station according to FIG. 1.
Figure 6:
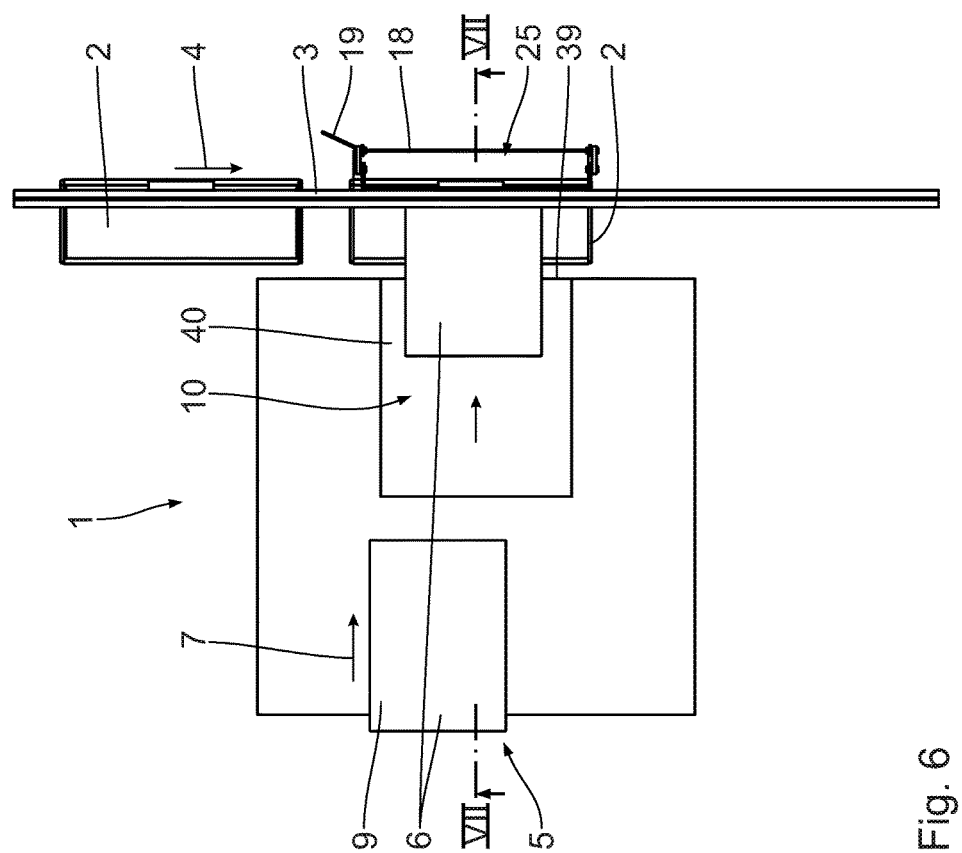
FIG. 6 shows a view, corresponding to FIG. 3, of a loading station comprising a guard device according to another embodiment.
Figure 7:
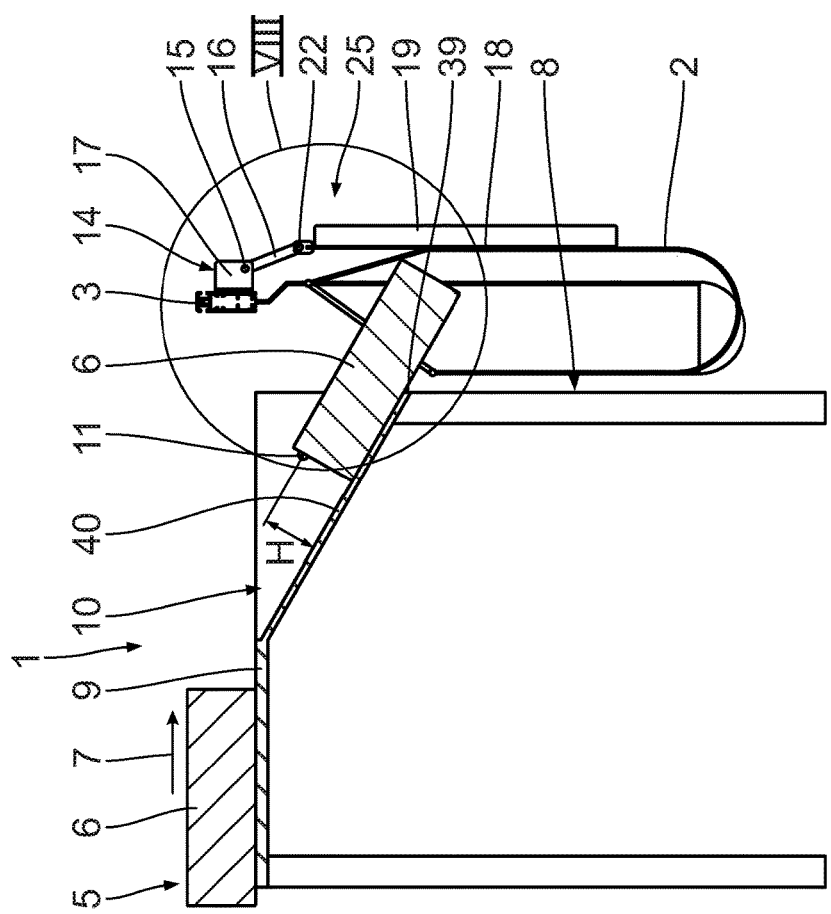
FIG. 7 shows a sectional view along section line VII-VII in FIG. 6.
Figure 8:
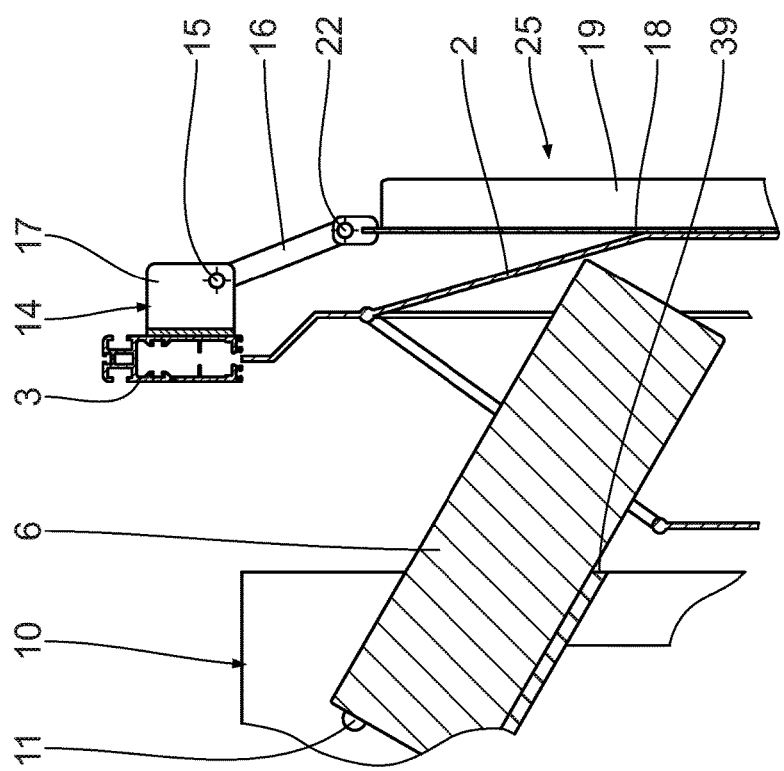
FIG. 8 shows an enlarged detail view of detail VIII in FIG. 7.
Figure 9:
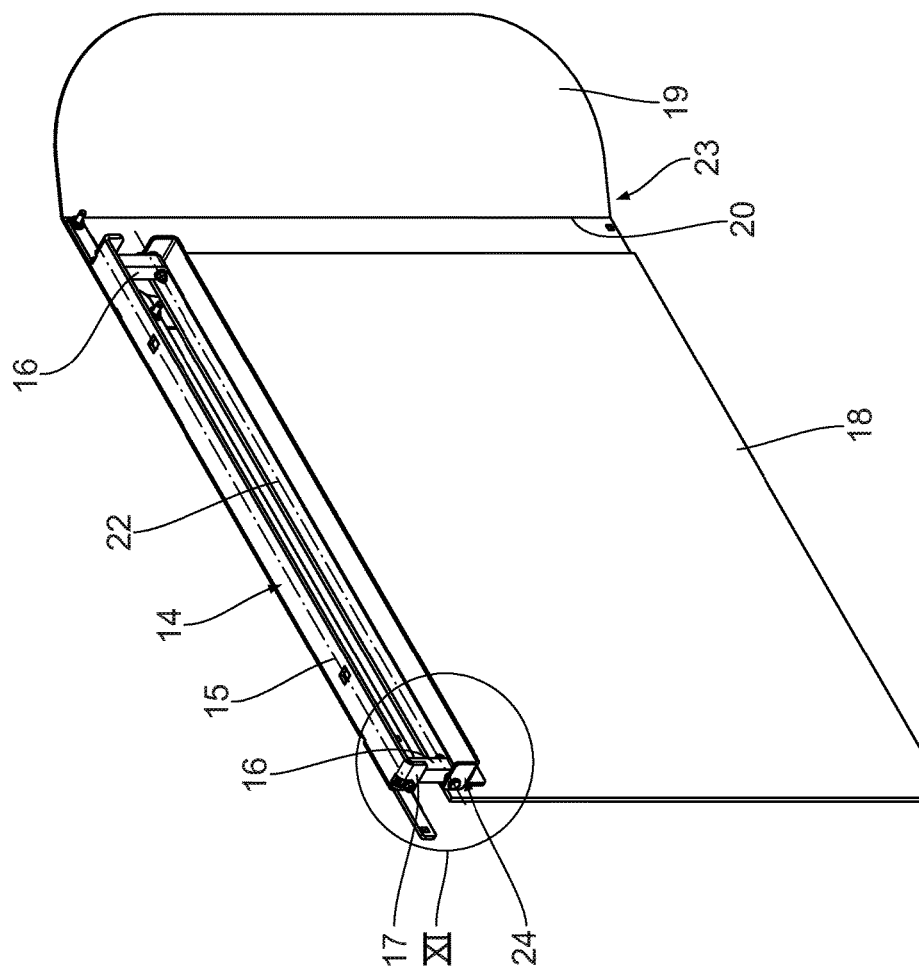
FIG. 9 shows an enlarged perspective view of the guard device according to FIG. 6.
Figure 10:
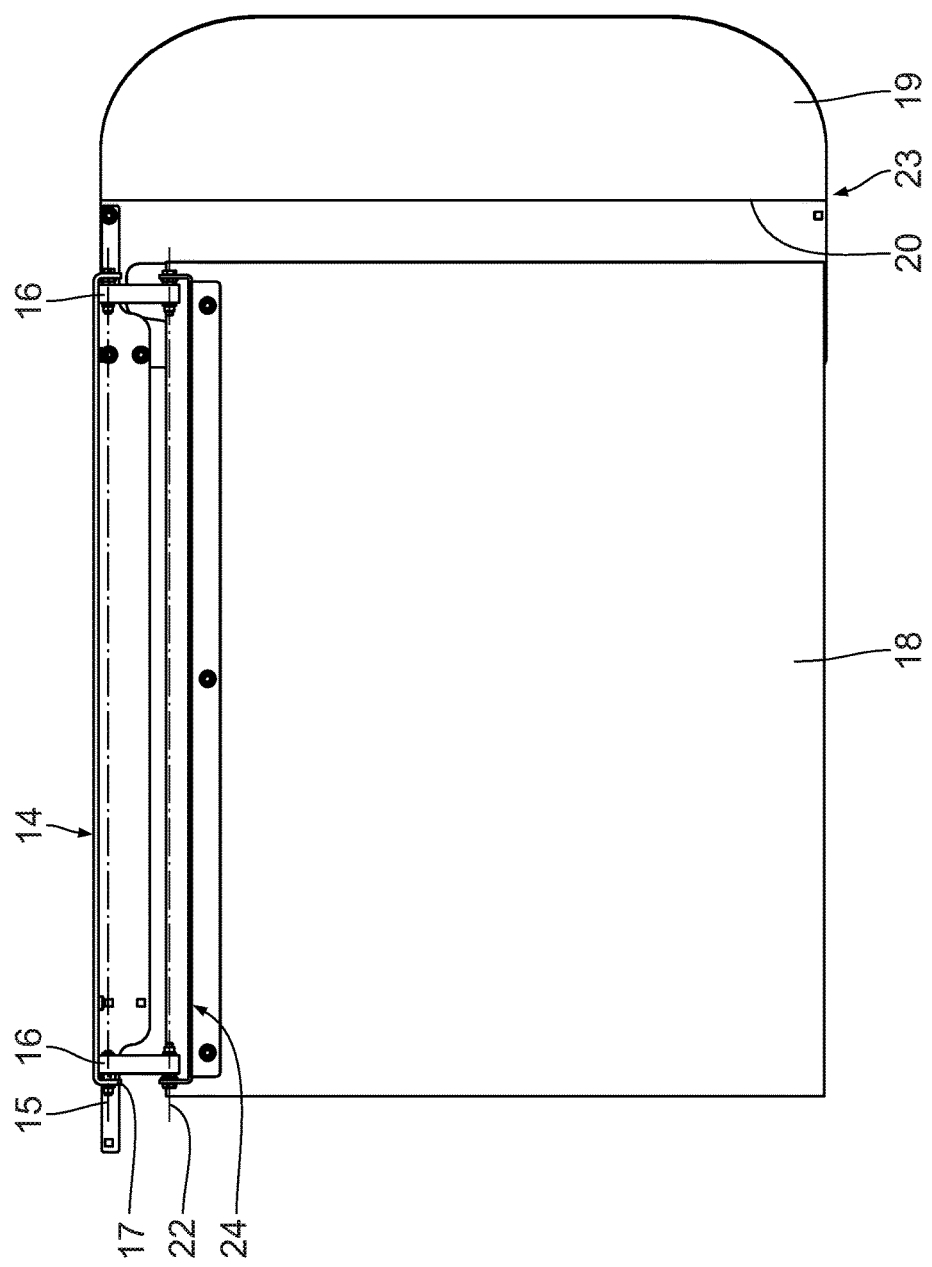
FIG. 10 shows a rear view of the guard device according to FIG. 9.
Figure 11:
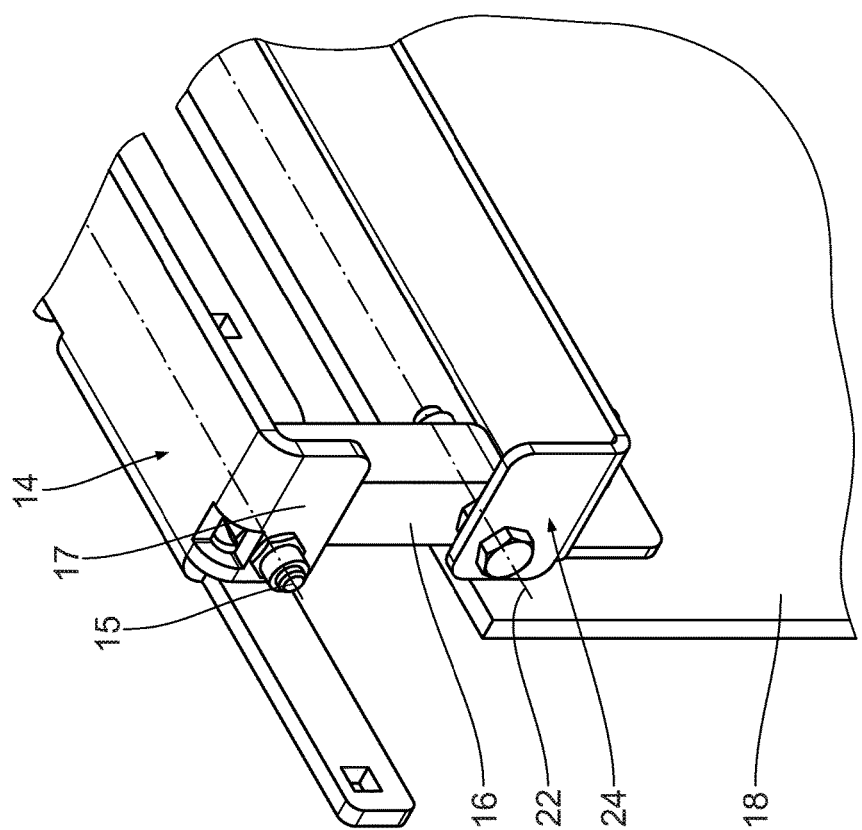
FIG. 11 shows an enlarged detail view of detail XI in FIG. 9.
Figure 12:
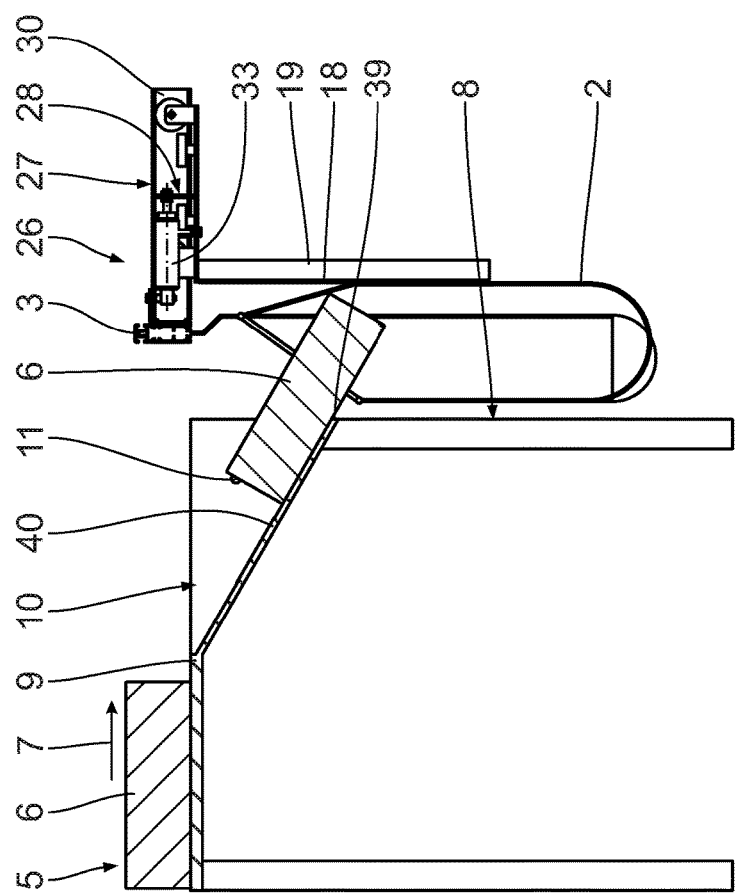
FIG. 12 shows a sectional view along section line XII-XII in FIG. 13 of another embodiment of the guard device.
Figure 13:
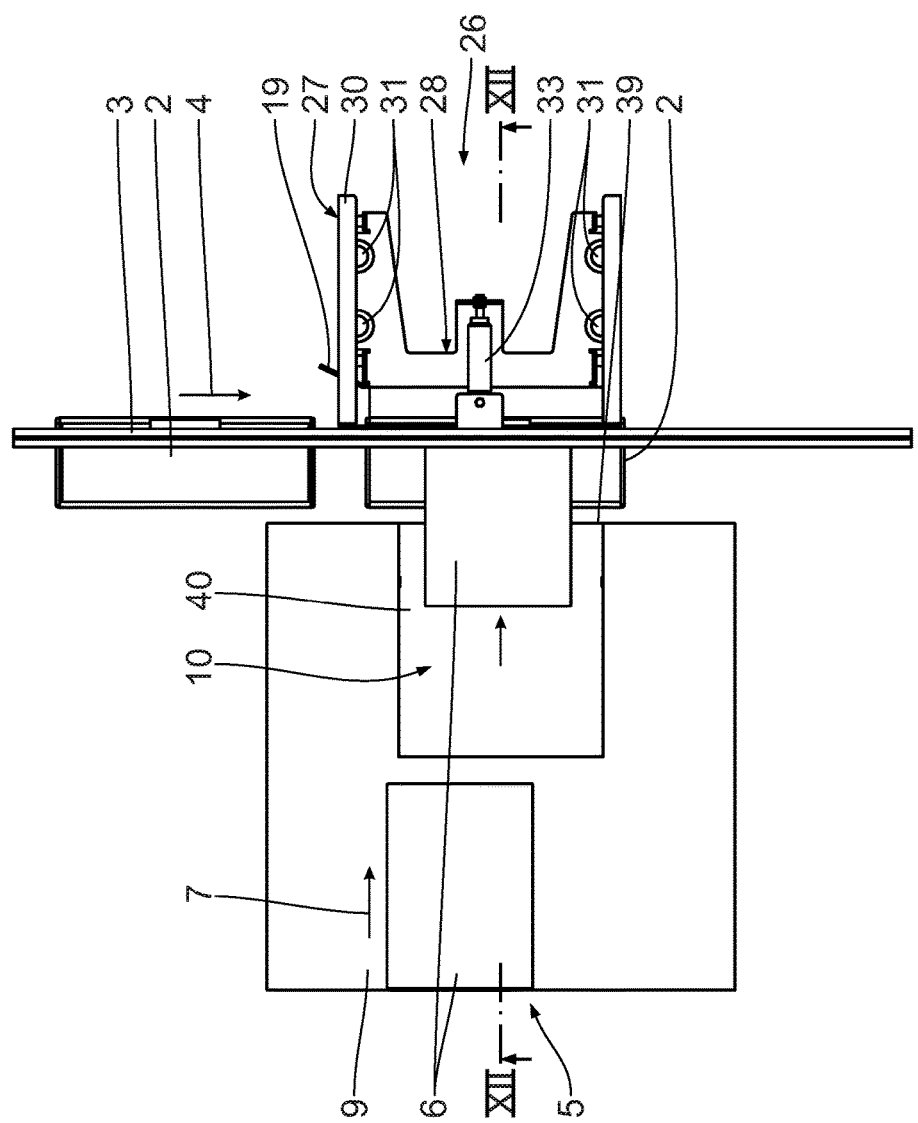
FIG. 13 shows a plan view of the guard device according to FIG. 12.
Figure 14:
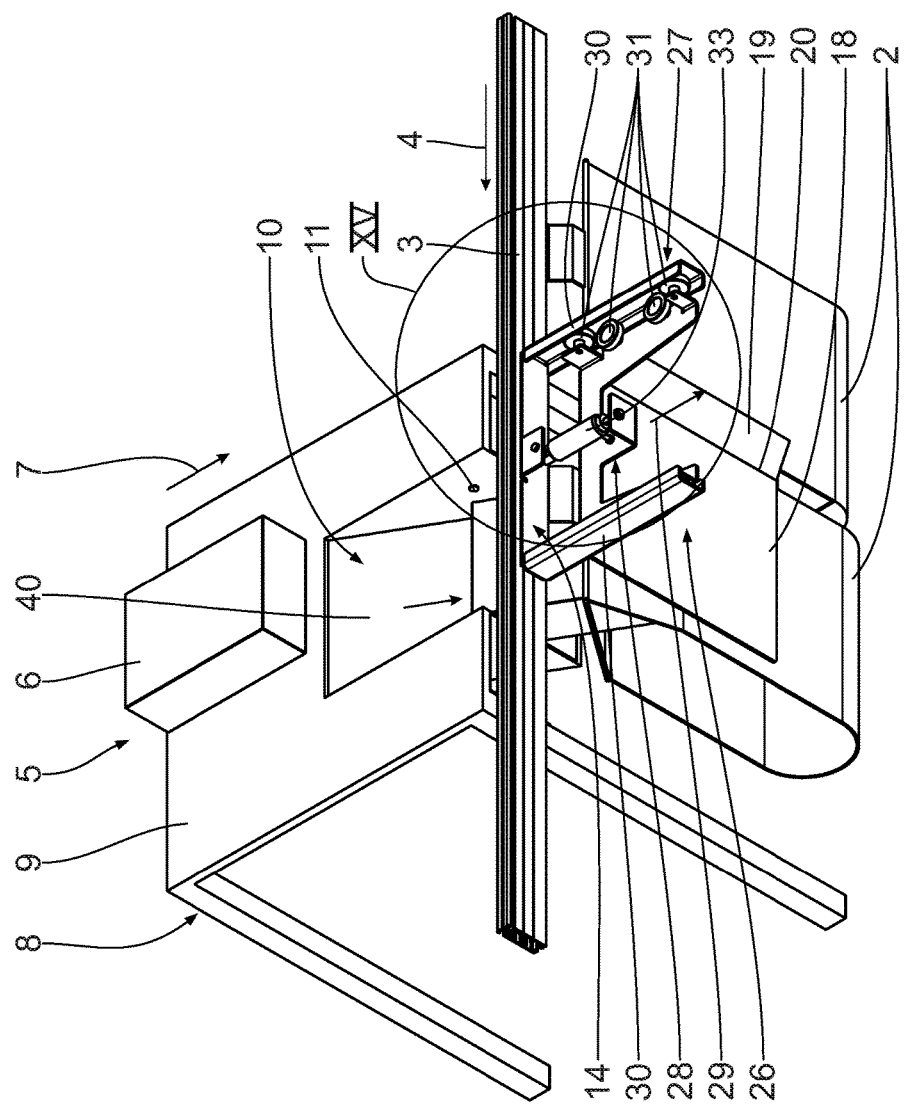
FIG. 14 shows a perspective view of the loading station according to FIG. 12.
Figure 15:
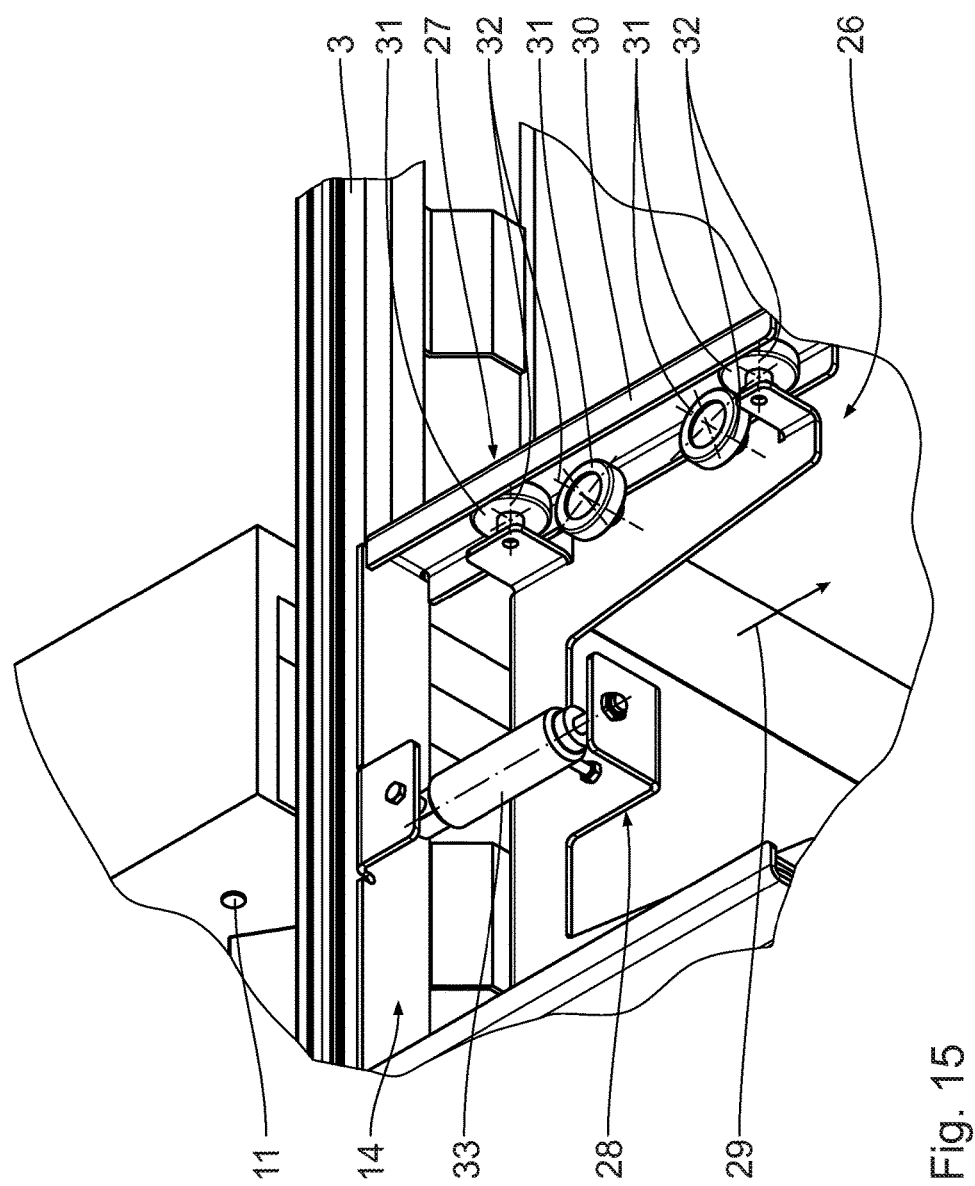
FIG. 15 shows an enlarged detail view of detail XV in FIG. 14.

A loading station 1 shown in FIGS. 1 to 5 is part of an overhead conveyor system not shown in more detail. In the overhead conveyor system, transport bags 2 are conveyed in a suspended condition along a conveying direction 4 defined by a conveyor device 3. The conveyor device 3 has a conveyor rail along which the transport bags 2 are arranged in such a way as to be displaceable via a roll member not shown in more detail. The roll member may be configured as a roll adapter or a hanger neck.

The transport bags 2 are made substantially of a textile material. The transport bags 2 have an upper metal frame that defines the opening for loading the transport bag 2. The transport bags 2 are suspended from the conveyor device 3 in a vertical direction due to gravity.

According to the exemplary embodiment shown, the conveyor device is oriented horizontally. To allow conveyance of the transport bags 2, the conveyor device 3 may be provided with a drive device, in particular a driven traction means, in particular a conveyor chain. As an alternative or in addition thereto, it is conceivable as well to arrange the conveyor device 3 with a slope to allow an automatic conveyance of the transport bags 2 due to gravity.

At the loading station 1, a stopping device not shown in more detail may be provided to ensure a defined stopping of the transport bags 2 at the loading station 1. A stopping device can also be configured in such a way that the drive device is stopped in a targeted manner, in particular in a controlled manner, when the transport bag has arrived at the desired position in the loading station 1. Detection of the target position of the transport bag 2 in the loading station 1 can be controlled by means of a sensor. The stopping device may also be provided with mechanical stopping members that prevent the transport bags 2 from being conveyed automatically, in particular due to gravity, along the conveying direction 4 any further.

The loading station 1 has a feed device 5 that serves to feed products 6 to be transported along a product feed direction 7. The feed device 5 is configured as a loading table 8 the table height of which is substantially identical to the level at which the conveyor rail of the conveyor device 3 is arranged.

According to the exemplary embodiment shown, the products to be transported are packaging boards configured in the shape of a cuboid. It is conceivable as well to provide differently shaped packaging boards to be transported. It is conceivable as well that the products to be transported are limp and comprise a textile product, for example, in particular a piece of clothing, arranged in an instable packaging bag.

The loading table 8 has an upper storage surface 9, which is oriented substantially horizontally. The storage surface 9 is provided with an inclined recess that forms a feed chute 10 for the product 6 to be transported towards the transport bag 2. The feed chute 10 has a slope facing the transport bag 2 allowing the products 6 to be transported, which are introduced into the feed chute 10 by an operator (not shown), for example, to slide into the open transport bag 2 automatically due to gravity. The feed chute 10 has a transfer edge 39 facing the transport bag 2. The transfer edge 39 terminates the feed chute 10 along the product feed direction 7. The products 6 to be transported are able to slide into the transport bag 2 via the transfer edge 39. A sliding of the products 6 to be transported along the product feed direction 7 is guaranteed as long as the center of mass of the products 6 to be transported is arranged on the inclined sliding surface 40 of the feed chute 10. As soon as the center of mass of the product 6 to be transported has passed over the transfer edge 39 along the product feed direction 7, the product 6 to be transported will fall over the transfer edge 39 and into the transport bag 2.

A detection unit 11 configured as a photoelectric sensor is provided in the region of the feed chute 10. The detection unit 11 is in a signal communication with a control unit 12, which is merely shown in a schematic view in FIG. 1. The signal communication may be implemented with or without wires.

The photoelectric sensor of the detection unit 11 is arranged at a vertical distance H (see FIG. 4) from the inclined sliding surface 40 of the feed chute 10. The detection unit 11 is configured to detect whether a height of a product to be transported is greater than the vertical distance H. If this is true, the detection unit 11 transmits a suitable signal to the control unit 12. It is conceivable that the control unit 12 is in signal communication with an actuator. The control unit 12 may transmit a control signal to the actuator, causing said actuator to trigger and/or assist a displacement of an impact plate 18.

The loading station 1 has a guard device 13 for the transport bags 2 in the loading station 1. The guard device 13 has a mounting unit 14 used to mount the guard device 13 to the conveyor device 3. The guard device 13 is in particular screwed to a rear side of the conveyor rail facing away from the feed device 5.

According to the exemplary embodiment shown, the mounting unit 14 is configured as a holding rail, which has a longitudinal extension along the conveying direction 4 that is substantially identical to the width of the feed chute 10.

A connection unit 16 is articulated to the mounting unit 14 in such a way as to be pivotable about a mounting unit pivot axle 15. The connection unit 16 has two rods 43 arranged at a distance from one another along the mounting unit pivot axle 15, with each of them being articulated to the mounting unit 14 in such a way as to be pivotable. The rods 43 are mounted to a rotating sleeve not shown in more detail. The rotating sleeve is rotatable about the mounting unit pivot axle 15. The rods 43 each extend from an outer side of the rotating sleeve in a radial direction relative to the mounting unit pivot axle 15.

The length of the rods 43 oriented in the radial direction relative to the mounting unit pivot axle 15 may vary and may in particular be defined such as to comply with the geometric relationships at the loading station 1. It is particularly conceivable that the length of the rods 43 is in each case zero, in other words that no rods 43 are provided. In this case, an impact plate 18 is articulated directly to the rotating sleeve.

The mounting unit 14 has two mounting lugs 17 oriented substantially perpendicular to the mounting unit pivot axle 15, the mounting lugs 17 being formed in one piece with the mounting unit 14. It is conceivable as well for the rods 43 of the connection unit 16 to be connected to each other along the conveying direction 4. In this case, the connection unit 16 is configured as a pivot frame. The pivot frame has a comparatively high stability, in particular along the mounting unit pivot axle 15.

Each of the rods 43 of the connection unit 16 is connected to an impact plate 18. The connection unit 16 is in particular rigidly connected to the impact plate 18. When the connection unit 16 is displaced, in particular pivoted, at an angle relative to the mounting unit 14, the impact plate 18 is immediately pivoted relative to the mounting unit 14 to a substantially identical degree. The impact plate 18 is made of a comparatively rigid and stable material. The impact plate 18 has a base area that is substantially equal to the size of the rear wall of the transport bag 2. In particular, the impact plate 18 is arranged in the region of the rear wall of the transport bag 2 where products 6 to be transported fed thereto come into contact with the transport bag 2. The impact plate 18 serves to support the rear wall of the transport bag 2.

The impact plate 18 has a feed member 19 provided to feed the transport bag 2 to the loading station 1 in an ordered manner. The feed member 19 is formed in one piece with the impact plate 18. The feed member 19 is in particular a plate member bent relative to the impact plate 18 about a bending edge 20. The feed member 19 prevents a lateral swinging of the transport bags 2 in a plane perpendicular to the conveying direction 3 when the transport bag 2 is being moved into the loading station 1, thus allowing the transport bag 2 to be loaded in a reliable and in particular error-free manner.

A loading of the transport bag 2 in the loading station 1 will hereinafter be explained in more detail by means of FIGS. 1 to 5. In a first step, an empty transport bag 2 to be loaded is conveyed along the conveyor device 3 and into the loading station 1 in the conveying direction 4 until the transport bag 2 is arranged with its upper opening at the feed chute 10. The product 6 to be transported is conveyed across the storage surface 9 and into the feed chute 10 along the product feed direction 7. The product 6 to be transported slides along the sliding surface 40 of the feed chute 10 in the direction of the transport bag 2 and can slide into the opening of the transport bag 2 automatically.

The impact plate 18 of the guard device 13 is configured such that if the product 6 to be transported is too big, in other words if the length thereof is in particular too long along the product feed direction 7 for the product 6 to be transported to fall over the transfer edge 39 and into the bag opening automatically due to gravity, it will be deflected flexibly. Said flexible deflection is made possible by the guard device 13 allowing the rear wall of the bag to be pivoted away from the feed chute 10, thus increasing the bag opening of the transport bag 2.

When the product 6 to be transported bears against the rear wall of the bag, this causes the impact plate 18 to be pushed away from the loading table 18 in a direction counter to gravity. As shown in FIG. 4, the impact plate 18 is pivoted about the mounting unit pivot axle 15 in a counterclockwise direction. The impact plate 18 is pivoted about an angle of rotation a in relation to the vertical 21, which corresponds to the initial position of the impact plate 18. As soon as the product 6 to be transported has been introduced and has fallen into the transport bag 2, the impact plate 18 is moved back in the initial position due to gravity. The loaded transport bag 2 is moved out of the loading station 1, thus allowing the next empty transport bag 2 to be loaded.

FIGS. 6 to 11 show another embodiment of a loading station 1. Components that are identical to those already explained above with reference to FIGS. 1 to 5 carry the same reference numerals and are not discussed in detail again.

The essential difference of the guard device 25 compared to the previous embodiment is that the impact plate 18 is articulated to the connection unit 16 so as to be pivotable about an impact plate pivot axle 22.

The second pivot axle of the connection unit 16 allows the impact plate 18 to hang down in a substantially vertical direction due to gravity. In this exemplary embodiment, the pivot angle a relative to the vertical 21 is 0°.

Another difference is that the impact plate 18 is provided with an extension 23 that is formed in one piece with the feed member 19.

The rods provided on both sides of the connection unit 16 are each pivotably connected, via a respective bolt connection, to the mounting unit 14 and to the impact plate 18. An impact plate rail 24 is provided to allow mounting to the impact plate. The impact plate rail 24 is configured substantially in the shape of a letter U in order to receive the bolt connection along the impact plate pivot axle 22. The mounting unit pivot axle 15 and the impact plate pivot axle 22 are oriented parallel to each other.

FIGS. 12 to 15 show another embodiment of a loading station comprising a guard device 26. Components that are identical to those already explained above with reference to FIGS. 1 to 11 carry the same reference numerals and are not discussed in detail again.

The connection unit 27 of the guard device 26 has a linear displacement member 28. In this embodiment, the impact plate 18 is linearly displaceable in relation to the mounting unit 14 along a displacement direction. The displacement direction 29 substantially corresponds to the product feed direction 7. The displacement direction 29 is oriented transversely and in particular perpendicular to the conveying direction 4 of the conveyor device 3.

The connection unit 27 has lateral guide tracks 30, in particular guide rails, along which guide rolls 31 are rollably guided.

The guide rolls 31 are each mounted to the connection unit 27 in such a way as to be rotatable about a roll axis 32. According to the exemplary embodiment shown, one guide track 30 is provided with in each case two guide rolls 31 for lateral guidance and with in each case two guide rolls 31 for vertical guidance. The corresponding axes of rotation 32 are oriented vertically or horizontally, respectively.

The guide tracks 30 are formed in one piece with the mounting unit 14. The guide tracks 30 are arranged immovably in relation to the conveying device 3. The guide rolls 31 are displaceable together with the connection unit 27 and, when doing so, roll along the guide face of the guide tracks 30.

The guard device 26 has an electrically drivable positioning cylinder 33 that is extendable in the manner of a telescope in the displacement direction 29 of the linear displacement member 28.

The positioning cylinder 33 in particular has an in particular integrated electric stepper motor not shown in more detail used as a drive device, said stepper motor interacting with a spindle drive, for example, to allow an axial displacement, in other words the extension in the manner of a telescope in the displacement direction 29. The positioning cylinder 33 in particular has an incremental encoder that interacts with a sensor member integrated in the cylinder, thus allowing the current extension position of the positioning cylinder to be detected.

The positioning cylinder 33 is in signal communication in particular with a control unit to execute an automated displacement of the guard device 26 by means of the positioning cylinder 33 depending, for example, on the size of the product to be transported.

It is generally conceivable to integrate an energy storage member in the positioning cylinder 33, in particular in the form of a compression spring that is compressed when the piston rod of the positioning cylinder 33 is being extended. As a result, a spring force develops that exerts a restoring force on the positioning cylinder 33 in such a way that the positioning cylinder 33 reverts into its initial position automatically, in particular in a self-acting manner.

Figure 16:
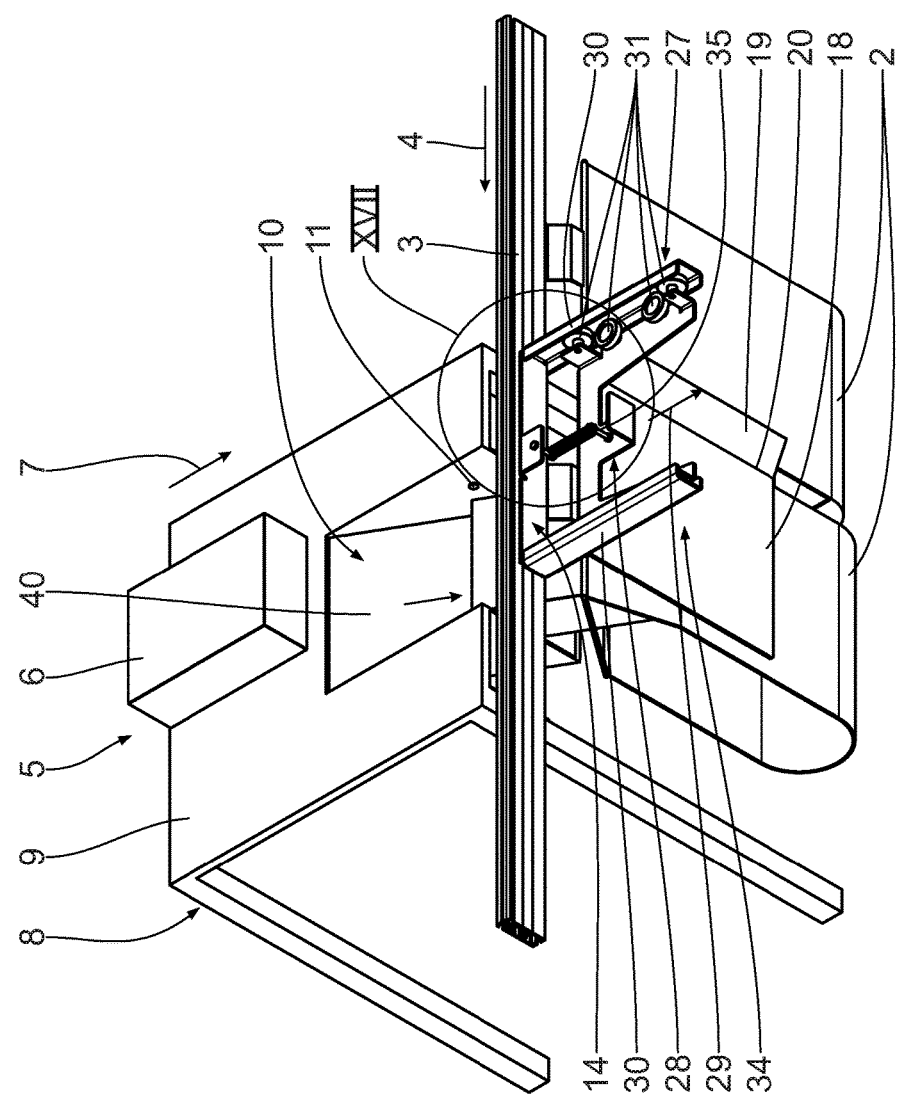
FIG. 16 shows a view, corresponding to FIG. 14, of a loading station comprising a guard device according to another embodiment.
Figure 17:
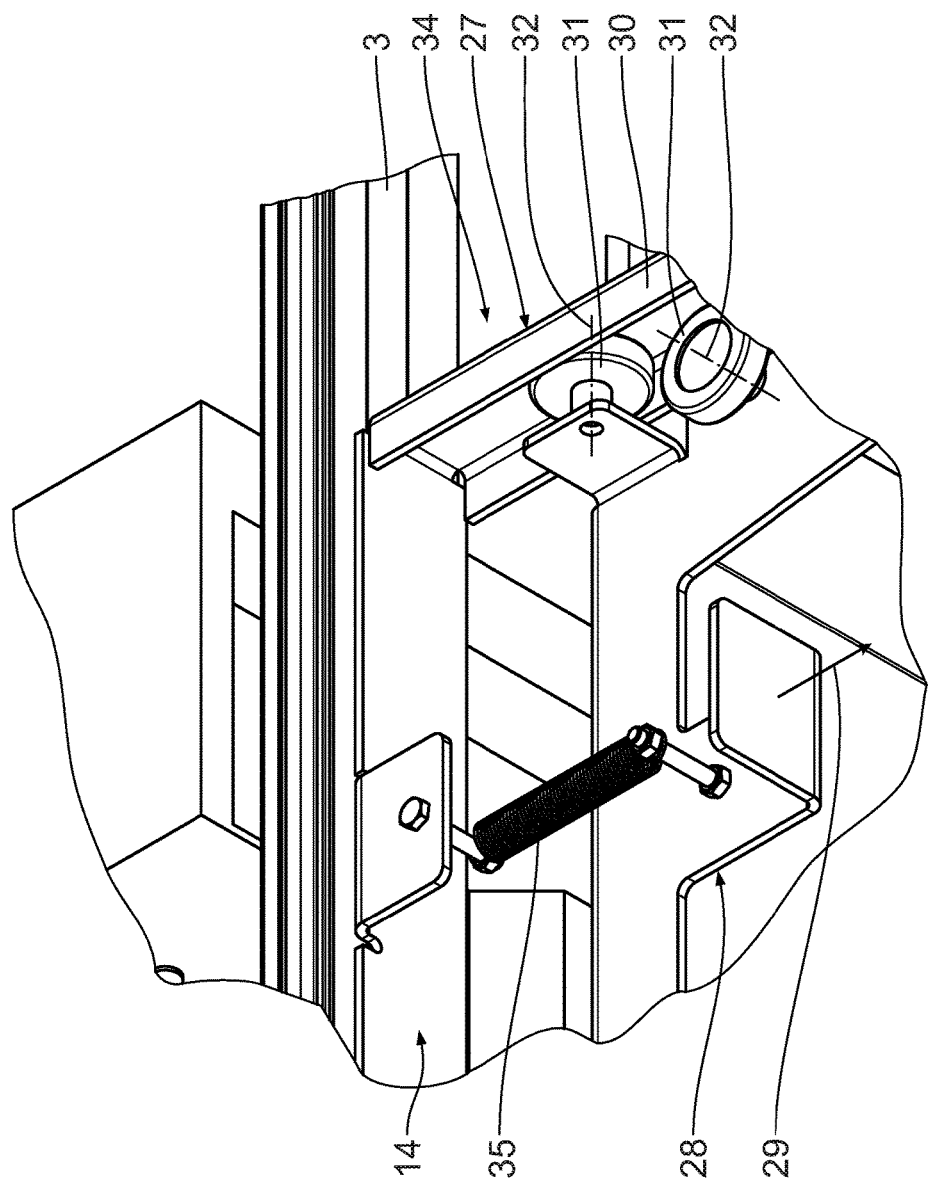
FIG. 17 shows an enlarged detail view of detail XVII in FIG. 16.
Figure 20:
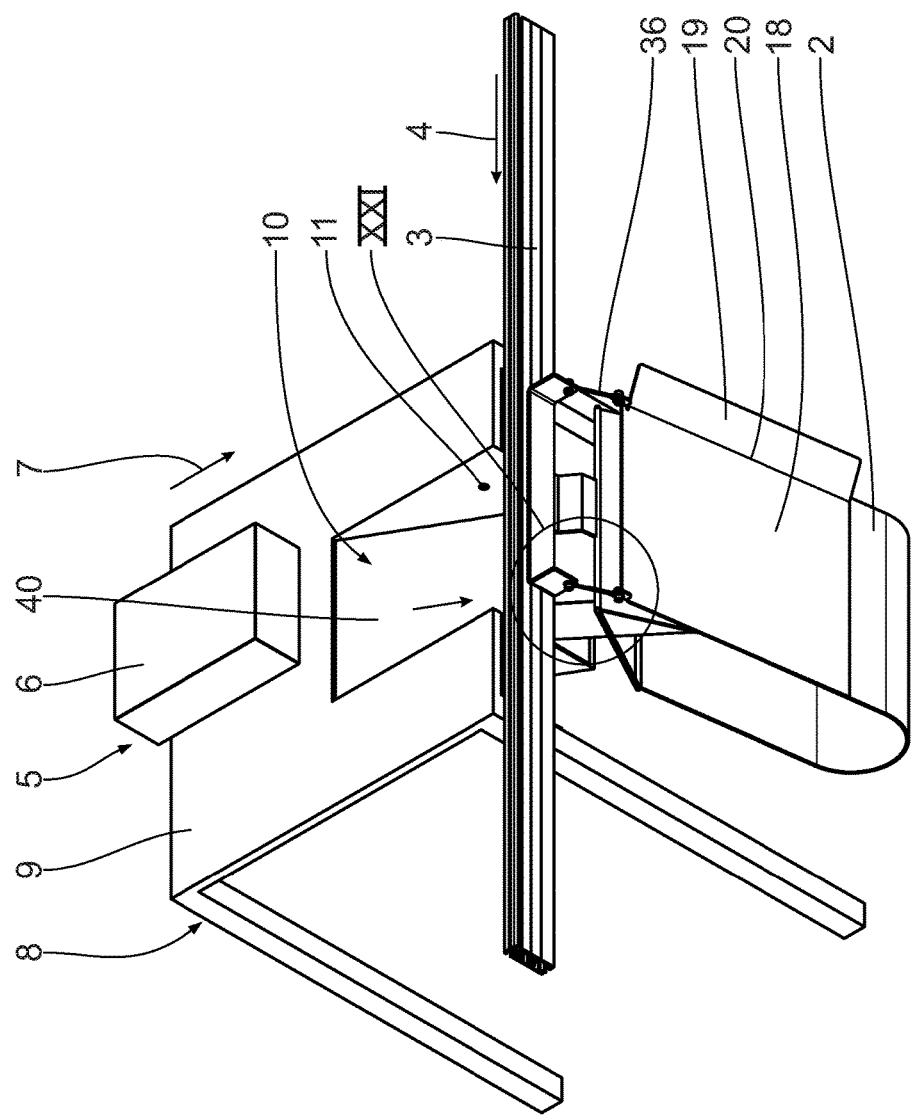
FIG. 20 shows a perspective view of the loading station according to FIG. 18.
Figure 21:
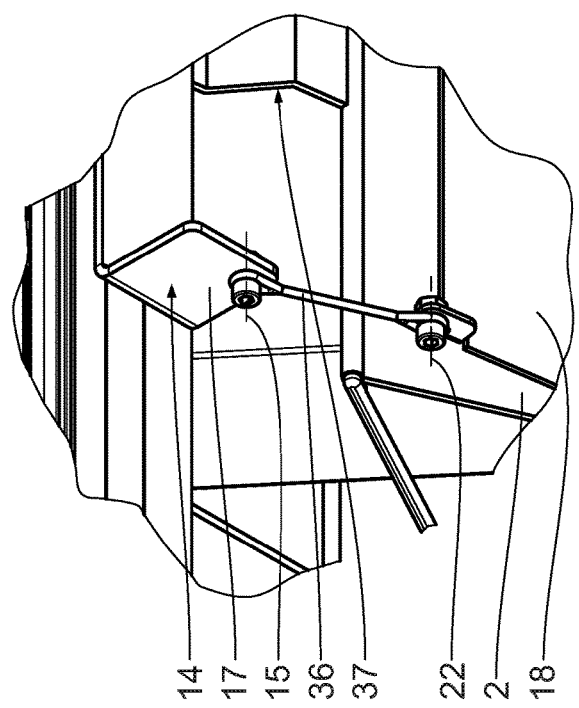
FIG. 21 shows an enlarged detail view of detail XXI in FIG. 20.

FIGS. 16 and 17 show another embodiment of a loading station 1. Components that are identical to those already explained above with reference to FIGS. 1 to 15 carry the same reference numerals and are not discussed in detail again.

The guard device 34 is substantially identical to the guard device 26, in other words it has a connection unit comprising a linear displacement member. The essential difference is that an energy storage member configured as a helical spring 35 is provided. The helical spring 35 is arranged, with a first end, on the mounting unit 14 and, with a second end, on the connection unit 27. A displacement of the connection unit 27 along the linear displacement direction 29 causes the helical spring 35 to rotate, with the result that a restoring force develops automatically if the impact plate 18 and the connection unit 27 are displaced by a product 6 to be transported.

In the exemplary embodiment shown, the energy storage member 35 is configured in such a way that it is arranged in a substantially force-free manner in its maximum retracted condition. An extension of the energy storage member 35 causes a force to be exerted on an internal energy storage in such a way that a restoring force develops that causes the connection unit to move back to its initial position. The energy storage member 35 assists and/or triggers the return movement of the connection unit 27 into the initial position as a return movement due to gravity does in particular not occur in the embodiment of the guard device 26 because the displacement direction 29 is oriented in particular horizontally there.

It is generally conceivable for the displacement direction to be configured in such a way as to have a slope that is oriented upwards, for example by mounting the guide tracks 30 in such a way as to have an upward slope relative to the horizontal. The return movement due to gravity is then assisted by the energy storage member 33. The guide tracks 30 are designed with a mechanically sturdy frame structure.

FIGS. 18 to 21 show another embodiment of a loading station 1. Components that are identical to those already explained above with reference to FIGS. 1 to 17 carry the same reference numerals and are not discussed in detail again.

The loading station substantially corresponds to the embodiment according to FIGS. 6 to 11, with the connection unit 16 being provided with two cable elements 36 instead of the rods. A respective first end of the cable elements 36 is in each case pivotably articulated to the mounting unit pivot axis 15 and to the impact plate pivot axis 22. As the cable elements 36 are only subjected to tensile loading, it is possible to use them instead of rods. The members of the connection unit 16 do not require an intrinsic stiffness. Designing the loading station with the cable elements 36 is simple and cost-saving.

Figure 22:
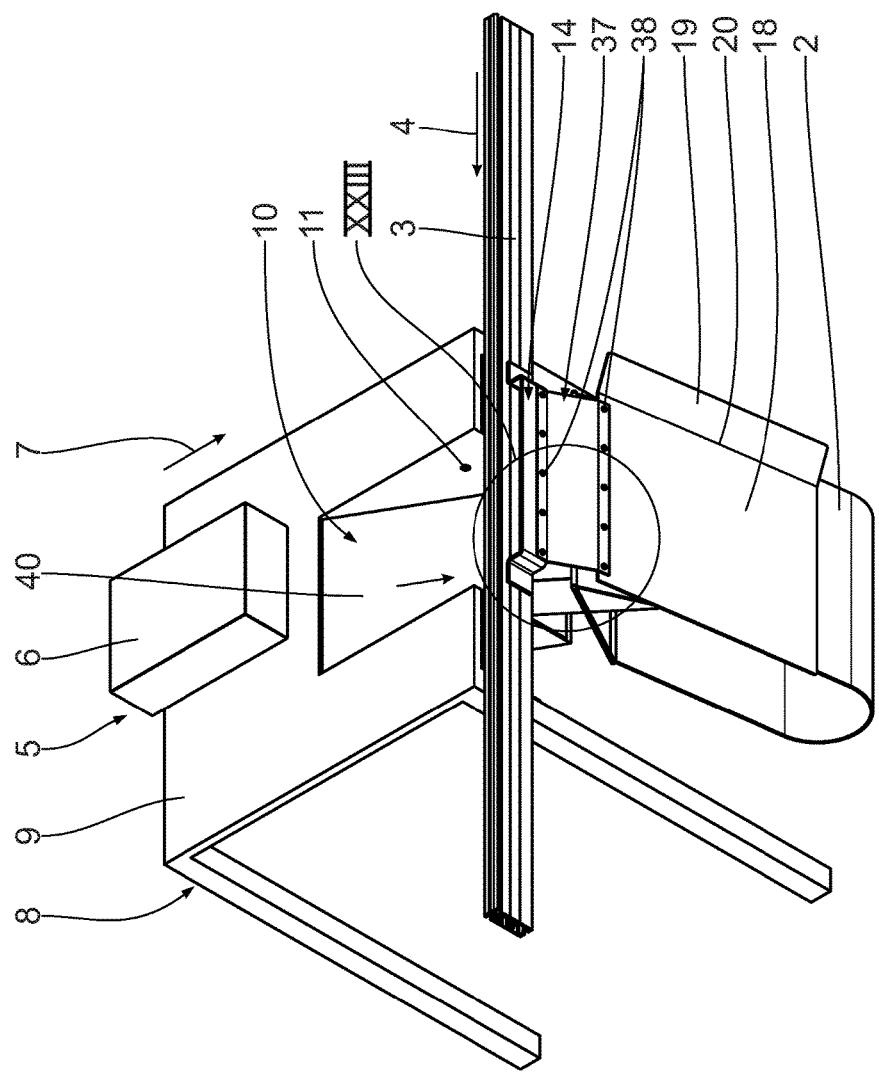
FIG. 22 shows a perspective view, corresponding to FIG. 2, of a loading station comprising a guard device according to another embodiment.
Figure 23:
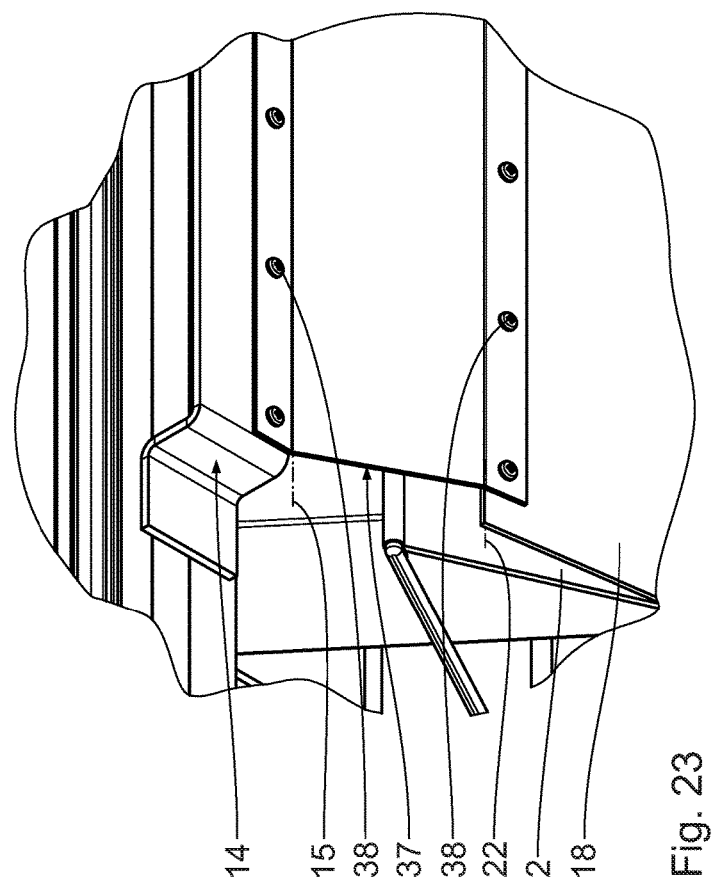
FIG. 23 shows an enlarged detail view of detail XXIII in FIG. 22.

FIGS. 22 and 23 show another embodiment of a loading station 1. Components that are identical to those already explained above with reference to FIGS. 1 to 21 carry the same reference numerals and are not discussed in detail again.

The essential difference compared to the previous embodiment is that the connection unit 16 has a flexible connection member 37 that runs continuously along the conveying direction 4. According to the exemplary embodiment shown, the connection element 37 is configured as a textile web of fabric that is in each case fastened to the mounting unit 14 and to the impact plate 18 by means of a plurality of fastening members 38. The flexible connection member 37 may also be made of leather or plastics. Fastening screws are used as fastening members 38.

The connection member 37 extends along the conveying direction 4 substantially across the entire width of the impact plate 18 and the mounting unit 14. The connection member 37 provides an increased lateral stability for the pivoting movement about the pivot axes 15, 22. The mounting unit pivot axis 15 and the impact plate pivot axis 22 are formed by integrated pivot joints of the connection member 37. A separate bolt connection is not required.

It is conceivable for the connection member 37 to be made of a material that has an intrinsic stiffness such as plastics. In this case, the pivot axes 15, 22 can be defined by living hinges of the connection member 37.

Figure 24:
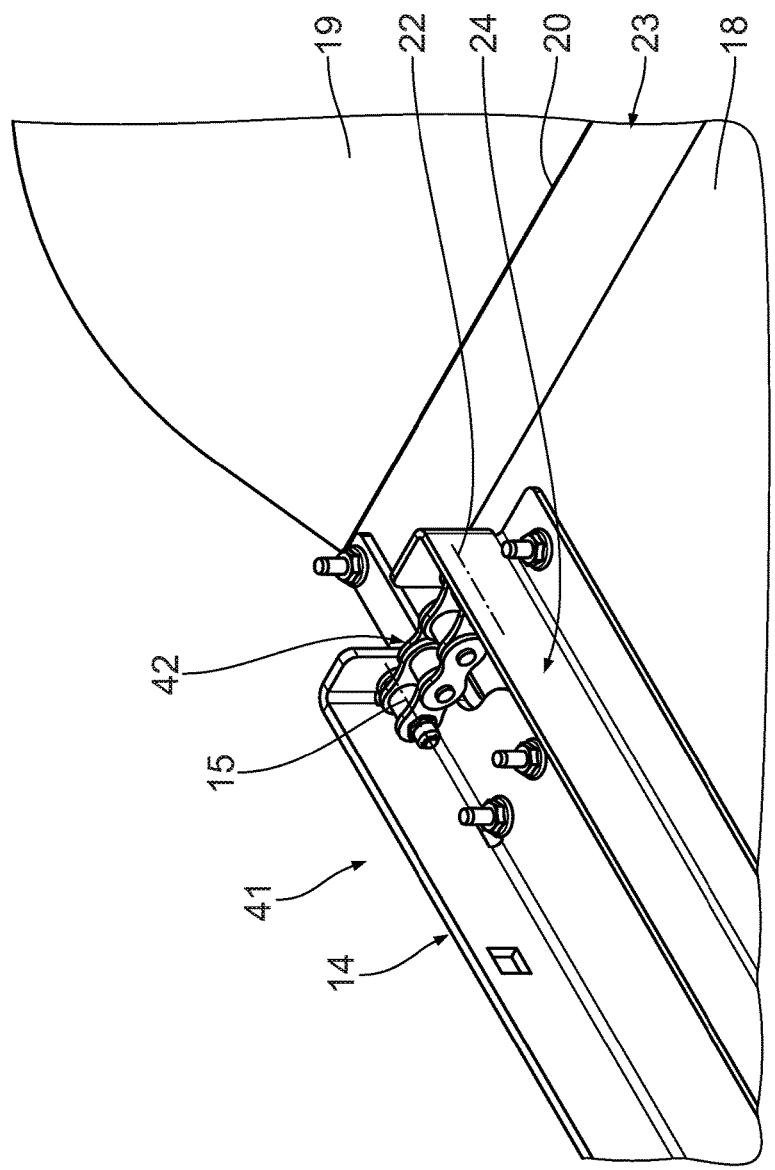
FIG. 24 shows an enlarged detail view, corresponding to FIG. 23, of another embodiment of a guard device comprising chain members.

FIG. 24 shows another embodiment of a guard device 41. Components that are identical to those already explained above with reference to FIGS. 1 to 23 carry the same reference numerals and are not discussed in detail again.

The essential difference compared to the previous embodiments is that the connection unit 16 has two chain segments 42 that are each articulated to the mounting unit 14 and to the impact plate 18 by means of double hinges in such a way as to be pivotable relative to the mounting unit pivot axle 15 and relative to the impact plate pivot axle 22. Each chain segment 42 has a plurality of, in particular at least two, chain links that are pivotably interconnected. The number of chain links of the chain segments 42 allows one to influence the parallel translation of the deflection of the impact plate 18. The chain segments 42 are available at a cost-effective price.

What is claimed is:

1. A guard device for transport bags in a loading station of an overhead conveyor system, the guard device comprising:
   a mounting unit to mount the guard device to a conveyor device of the overhead conveyor system;
   a transport bag for transporting single items;
   an impact plate to support a rear wall of the transport bag when being loaded with a product to be transported;
   a connection unit to movably connect the impact plate to the mounting unit.

2. The guard device according to claim 1, wherein the connection unit is articulated to the mounting unit such that the connection unit is pivotable about a mounting unit pivot axle.

3. The guard device according to claim 1, wherein the connection unit is articulated to the impact plate in such that the connection unit is pivotable about an impact plate pivot axle.

4. The guard device according to claim 2, wherein the connection unit comprises at least one a chain, a rod, a bar, a cable and a textile web.

5. The guard device according to claim 1, wherein the connection unit comprises an energy storage member.

6. The guard device according to claim 1, wherein the connection unit comprises a displacement actuator for a driven displacement of the impact plate.

7. The guard device according to claim 1, wherein the impact plate comprises a feed member for an ordered feeding of the transport bag into the loading station.

8. A guard device according to claim 1, wherein the connection unit comprises a linear displacement member for a linear displacement of the impact plate in relation to the mounting unit along a displacement direction.

9. A guard device according to claim 1, wherein the impact plate faces in a direction of the transport bag when the transport bag is being loaded with product.

10. A guard device for transport bags in a loading station of an overhead conveyor system, the guard device comprising:
    a mounting unit to mount the guard device to a conveyor device of the overhead conveyor system;
    an impact plate to support a rear wall of a transport bag when being loaded with a product to be transported; and
    a connection unit to movably connect the impact plate to the mounting unit, wherein the connection unit comprises a linear displacement member for a linear displacement of the impact plate in relation to the mounting unit along a displacement direction.

11. The guard device according to claim 10, wherein the connection unit comprises guide members for the guided displacement along the displacement direction.

12. The guard device according to claim 11, wherein guide rolls are provided that roll along guide tracks matching said guide rolls.

13. A loading station for an overhead conveyor system, the loading station comprising:
    a conveyor device to convey the transport bags;
    a feed device to feed transport products into the transport bags along a product feed direction;
    a guard device mounted to the conveyor device, the guard device comprising a mounting unit to mount the guard device to the conveyor device, an impact plate and a connection unit to movably connect the impact plate to the mounting unit, wherein a rear wall of each transport bag is supported by said impact plate when being loaded with the product.

14. The loading station according to claim 13, wherein the impact plate is oriented perpendicular to the product feed direction.

15. The loading station according to claim 13, further comprising a detection unit to detect at least one of the size and the mass of the product to be transported.

16. The loading station according to claim 13, further comprising a control unit for the controlled loading of the transport bag in the loading station.

17. The loading station according to claim 16, wherein the control unit is in a signal communication with at least one of the detection unit and a displacement actuator for the targeted loading of the transport bag.

18. The loading station according to claim 13, wherein the feed device comprises a storage surface with a feed chute, the transport bags being movable in a conveying direction via the conveyor device, the impact plate being located at a spaced location from the feed chute.

19. The loading station according to claim 13, wherein the connection unit comprises a linear displacement member for a linear displacement of the impact plate in relation to the mounting unit along a displacement direction.

20. The loading station according to claim 13, wherein the impact plate faces in a direction of one of the transports bags when one of the transport bags is being loaded with product.

* * * * *